US011658533B2

(12) United States Patent
Leonardi et al.

(10) Patent No.: US 11,658,533 B2
(45) Date of Patent: May 23, 2023

(54) THERMAL MANAGEMENT ASSEMBLY WITH END CAP AND SEAL FOR AN ELECTRIFIED VEHICLE

(71) Applicant: Ford Global Technologies, LLC, Dearborn, MI (US)

(72) Inventors: Franco Leonardi, Dearborn Heights, MI (US); Michael W. Degner, Novi, MI (US); Prasad Dev Hanumalagutti, Dearborn, MI (US); Myung Ki Sung, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 583 days.

(21) Appl. No.: 16/775,927

(22) Filed: Jan. 29, 2020

(65) Prior Publication Data

US 2021/0234423 A1    Jul. 29, 2021

(51) Int. Cl.
| *H02K 3/24* | (2006.01) |
| *H02K 5/18* | (2006.01) |
| *H02K 5/20* | (2006.01) |
| *B60K 1/00* | (2006.01) |

(52) U.S. Cl.
CPC ................. *H02K 3/24* (2013.01); *H02K 5/18* (2013.01); *H02K 5/203* (2021.01); *B60K 2001/003* (2013.01)

(58) Field of Classification Search
CPC .. H02K 9/19; H02K 5/20; H02K 1/32; H02K 3/24; H02K 9/00; H02K 9/14; H02K 9/193; H02K 9/197; H02K 5/203; H02K 5/207; B60K 2001/003
See application file for complete search history.

(56) References Cited

U.S. PATENT DOCUMENTS

| 3,456,140 | A  | * | 7/1969 | Lacey ..................... H02K 9/197 |
|           |    |   |        | 310/59 |
| 9,331,553 | B2 |   | 5/2016 | Mayor et al. |
| 10,008,907 | B2 |   | 6/2018 | Hanumalagutti et al. |
| 10,069,379 | B2 |   | 9/2018 | Hanumalagutti et al. |
| 10,097,066 | B2 |   | 10/2018 | Hanumalagutti et al. |
| 10,135,319 | B2 |   | 11/2018 | Hanumalagutti et al. |
| 10,536,055 | B2 |   | 1/2020 | Hanumalagutti et al. |
| 2013/0300229 | A1 | * | 11/2013 | Muller .................... H02K 5/203 |
|           |    |   |        | 165/172 |
| 2017/0267055 | A1 |   | 9/2017 | Hanumalagutti et al. |
| 2017/0271951 | A1 | * | 9/2017 | Hanumalagutti ...... H02K 15/12 |
| 2017/0310189 | A1 |   | 10/2017 | Hanumalagutti et al. |
| 2018/0340533 | A1 | * | 11/2018 | Böhm ..................... H02K 3/44 |

* cited by examiner

*Primary Examiner* — Tulsidas C Patel
*Assistant Examiner* — Robert E Mates
(74) *Attorney, Agent, or Firm* — David B. Kelley; Brooks Kushman P.C.

(57) ABSTRACT

An electric machine for an electrified vehicle includes a stator core configured to receive a plurality of windings and an overmolded midsection formed about the stator core. The midsection also defines a first interlocking feature disposed near an end face of the stator core. The electric machine also includes an end cap defining at least a portion of a coolant channel and a second interlocking feature configured to engage the first interlocking feature and create a fluid seal to retain fluid within the coolant channel. The coolant channel is further arranged to encase end portions of the plurality of windings and direct circulating coolant across the end portions.

11 Claims, 10 Drawing Sheets

FIG. 11 ated and described with reference to any one of the figures
THERMAL MANAGEMENT ASSEMBLY WITH END CAP AND SEAL FOR AN ELECTRIFIED VEHICLE

TECHNICAL FIELD

The present disclosure relates to a thermal management assembly for an electric machine of an electrified vehicle.

BACKGROUND

Extended drive range technology for electrified vehicles, such as battery electric vehicles ("BEVs") and plug in hybrid vehicles ("PHEVs"), continually increases demands on electric machines used for vehicle propulsion. Specifically, achieving increased driving ranges may require traction batteries and electric machines to have higher power outputs and associated thermal management systems with increased capacities relative to previous BEVs and PHEVs.

SUMMARY

An electric machine for an electrified vehicle includes a stator core configured to receive a plurality of windings and an overmolded midsection formed about the stator core. The midsection also defines a first interlocking feature disposed near an end face of the stator core. The electric machine also includes an end cap defining at least a portion of a coolant channel and a second interlocking feature configured to engage the first interlocking feature and create a fluid seal to retain fluid within the coolant channel. The coolant channel is further arranged to encase end portions of the plurality of windings and direct circulating coolant across the end portions.

A thermal management system for an electric machine of an electrified vehicle includes an end cap secured to the electric machine and defining at least a first portion of a closed coolant channel. The thermal management system also includes a midsection overmolded about a stator core and defining a second portion of the closed coolant channel. Each of the end cap and the midsection include at least one sealing element to maintain a fluid seal of the coolant channel. The coolant channel also is arranged such that end windings of the electric machine are disposed therein and in thermal communication with coolant circulated through the coolant channel.

A thermal management system for an electric machine of an electrified vehicle includes a stator core having a plurality of windings routed therethrough, wherein end portions of the windings extend beyond and end face of the stator core. The thermal management system also includes an overmolded midsection formed about the stator core including a radially-extending flange covering at least a portion of the end face. The thermal management system further includes an annular end cap secured to the stator core to form a closed coolant circulation channel, wherein each of the midsection and the end cap include corresponding interlocking features that engage to generate a fluid seal to retain fluid within the coolant circulation channel.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An electric machine may include a thermal management assembly that introduces an oil or other dielectric fluid to portions of the electric machine for cooling purposes. In some examples, the oil may be dripped or sprayed onto wire end windings of the electric machine. However, non-uniformity of coolant flow as applied to the end windings may reduce cooling efficacy at the end windings. An air-cooled thermal management assembly may alternatively be provided to assist in managing thermal conditions of an electric machine. Airflow cooling may require a fan or blower to be in fluid flow connection to the end windings to push air thereto for cooling purposes. Such a configuration may also require additional components such as ducting that consume package space.

According aspects of the present disclosure, an electric machine includes an integrated thermal management system having an end cap that defines at least a portion of the coolant circulation channel. According to other aspects of the present disclosure, the electric machine includes a stator having an overmolded portion that defines at least a portion of the coolant circulation channel. According to further aspects of the present disclosure, at least one of the end cap and the overmolded portion of the stator include interlocking features that provide a fluid seal to contain a fluid within the coolant circulation channel.

Figure 1:
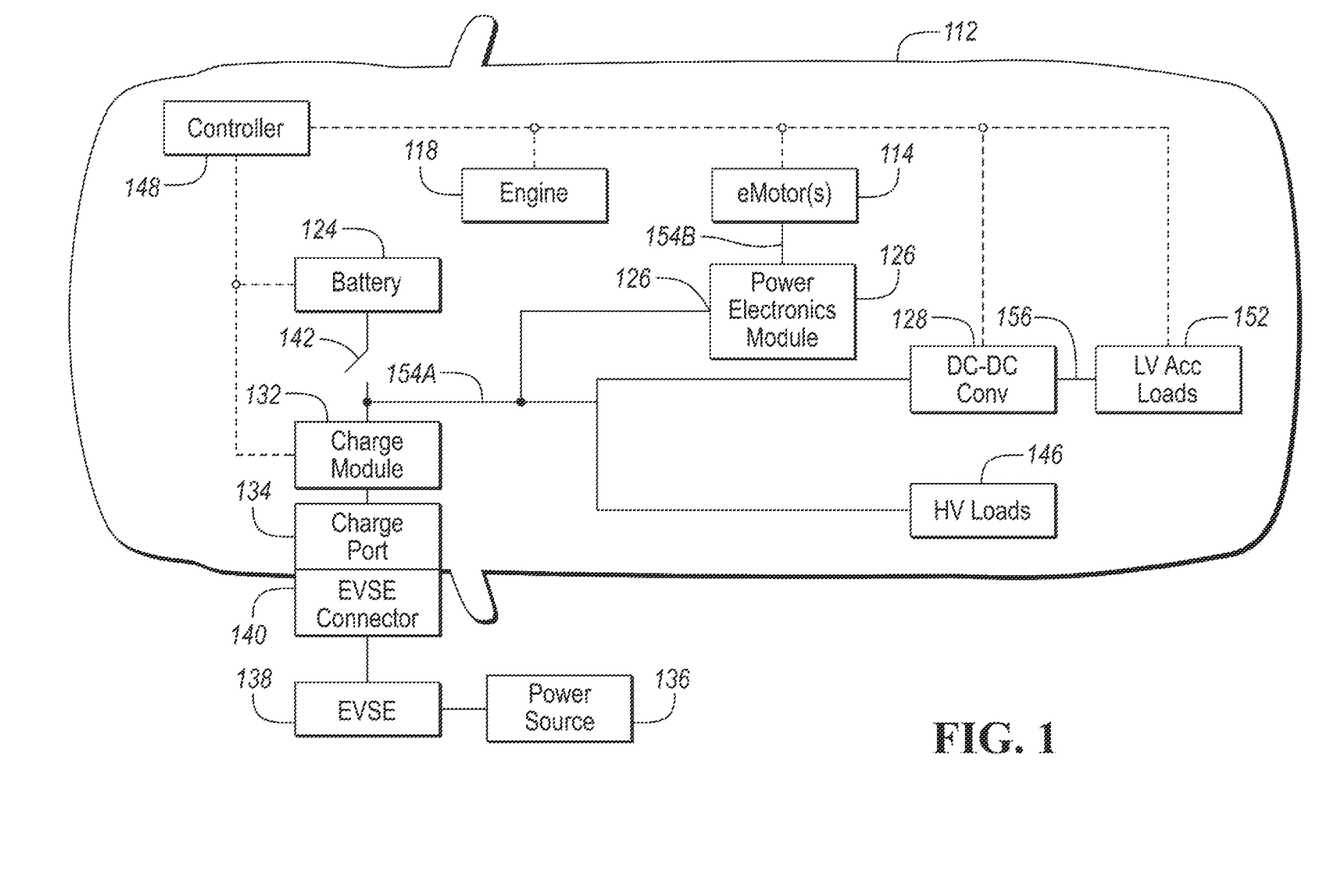
FIG. 1 is a schematic diagram of an example electrified vehicle.

FIG. 1 depicts a hybrid-electric vehicle (HEV) 112. The HEV 112 includes an electrified propulsion system having one or more electric machines 114 mechanically coupled to a hybrid transmission (not shown). The electric machines 114 may be capable of operating as a motor or a generator. In addition, the hybrid transmission is mechanically coupled to an internal combustion engine 118 (i.e., ICE). The electric machines 114 are arranged to provide propulsion torque as well as slowing torque capability either while the engine 118 is operated or turned off. The electric machines 114 are capable of operating as generators to provide fuel economy benefits by recovering energy that would normally be lost as heat in a friction braking system. The electric machines 114 may additionally impart a reaction torque against the engine output torque to generate electricity for recharging a traction battery the while the vehicle is operating. The electric machines 114 may further reduce vehicle emissions by allowing the engine 118 to operate near the most efficient speed and torque ranges. When the engine 118 is off, the HEV 112 may be operated in an electric-only drive mode using the electric machines 114 as the sole source of propulsion. The hybrid transmission is also mechanically coupled to road wheels to output torque from the electric machines 114 and/or combustion engine 118.

A traction battery or battery pack 124 stores energy that can be used to power the electric machines 114. The battery pack 124 provides a high-voltage direct current (DC) output. One or more contactors 142 may isolate the traction battery 124 from a DC high-voltage bus 154A when opened and couple the traction battery 124 to the DC high-voltage bus 154A when closed. The traction battery 124 is electrically coupled to one or more power electronics modules 126 via the DC high-voltage bus 154A. The power electronics module 126 is also electrically coupled to the electric machines 114 and provides the ability to bi-directionally transfer energy between AC high-voltage bus 154B and the electric machines 114. According to some examples, the traction battery 124 may provide a DC current while the electric machines 114 operate using a three-phase alternating current (AC). The power electronics module 126 may convert the DC current to a three-phase AC current to operate the electric machines 114. In a regenerative mode, the power electronics module 126 may convert the three-phase AC current output from the electric machines 114 acting as generators to DC current compatible with the traction battery 124. The description herein is equally applicable to an all-electric vehicle without a combustion engine.

In addition to providing energy for propulsion, the traction battery 124 may provide energy for other vehicle electrical systems. The vehicle 112 may include a DC/DC converter module 128 that is electrically coupled to the high-voltage bus 154. The DC/DC converter module 128 may be electrically coupled to a low-voltage bus 156. The DC/DC converter module 128 may convert the high-voltage DC output of the traction battery 124 to a low-voltage DC supply that is compatible with low-voltage vehicle loads 152. The low-voltage bus 156 may be electrically coupled to an auxiliary battery 130 (e.g., 12V battery). The low-voltage loads 152 may be electrically coupled to the low-voltage bus 156. The low-voltage loads 152 may include various controllers within the vehicle 112.

The traction battery 124 of vehicle 112 may be recharged by an off-board power source 136. The off-board power source 136 may be a connection to an electrical outlet. The external power source 136 may be electrically coupled to a charger or another type of electric vehicle supply equipment (EVSE) 138. The off-board power source 136 may be an electrical power distribution network or grid as provided by an electric utility company. The EVSE 138 provides circuitry and controls to regulate and manage the transfer of energy between the power source 136 and the vehicle 112. The off-board power source 136 may provide DC or AC electric power to the EVSE 138.

The various components discussed may have one or more associated controllers to control, monitor, and coordinate the operation of the components. The controllers may communicate via a serial bus (e.g., Controller Area Network (CAN)) or via discrete conductors. In addition, a vehicle system controller 148 may be provided to coordinate the operation of the various components such as governing electrical flow to and from the one or more electric machines.

Figure 2:
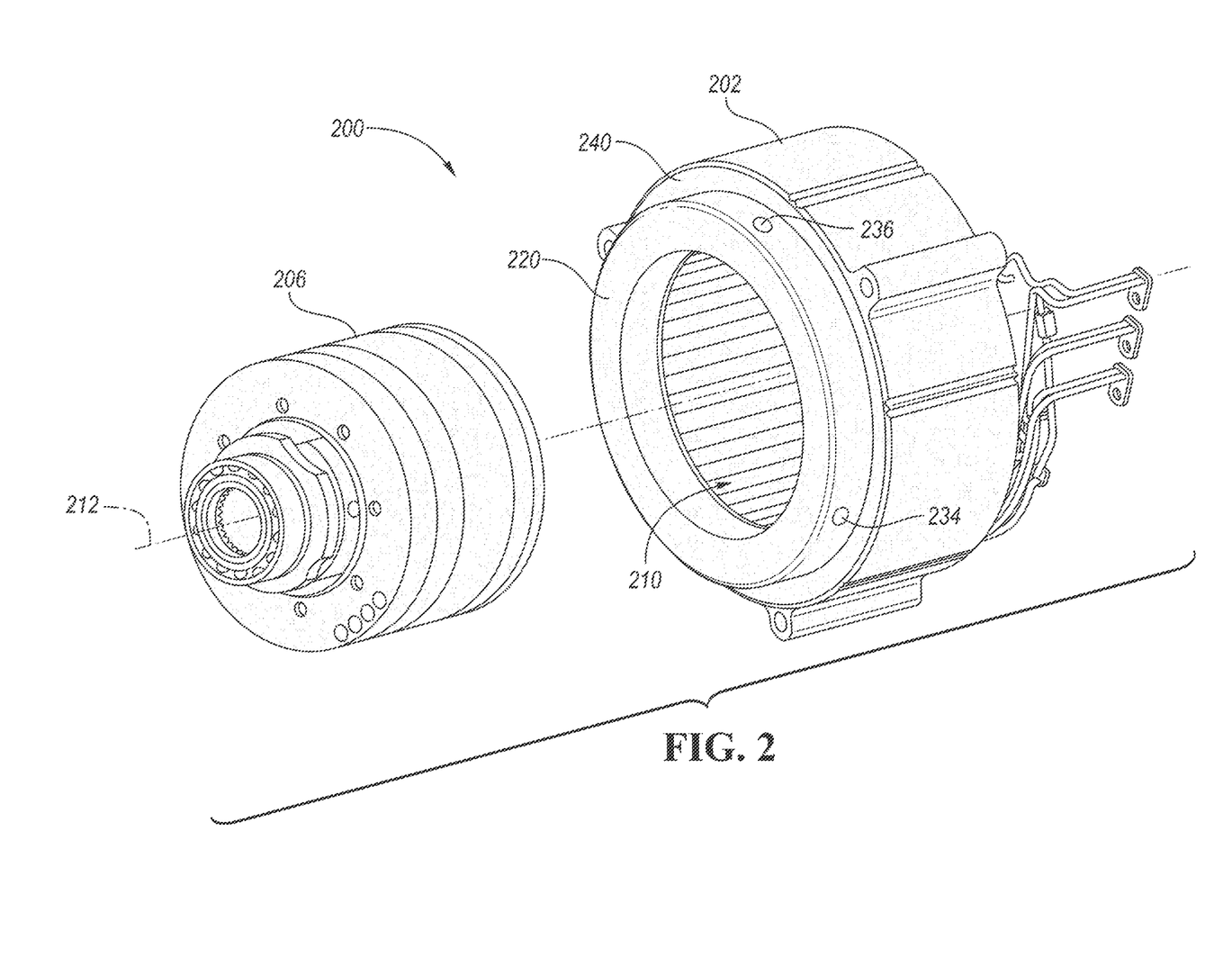
FIG. 2 is a partial exploded view of an example electric machine.

FIG. 2 depicts an exploded view of an electric machine 200, for example, for propulsion of an electrified vehicle. The electric machine 200 may include a stator 202 and a rotor 206. As discussed above, an electrified vehicle may include a plurality of electric machines. In some examples, one of the electric machines may function primarily as a motor and the other may function primarily as a generator. The motor may operate to convert electricity to mechanical power and the generator may operate to convert mechanical power to electricity. In other examples, an electric machine may be disposed at one or more wheels to provide propulsion and/or generation at the corresponding individual wheel.

The stator 202 may include an iron stator core 218 formed by a stack of laminations. The stator core 218 defines a central cavity 210, where the rotor 206 is sized for disposal and operation within the central cavity 210. A shaft (not shown) may be operably connected to the rotor 206 to receive drive torque resulting from electric machine output rotation of the rotor 206 about axis 212.

Figure 3:
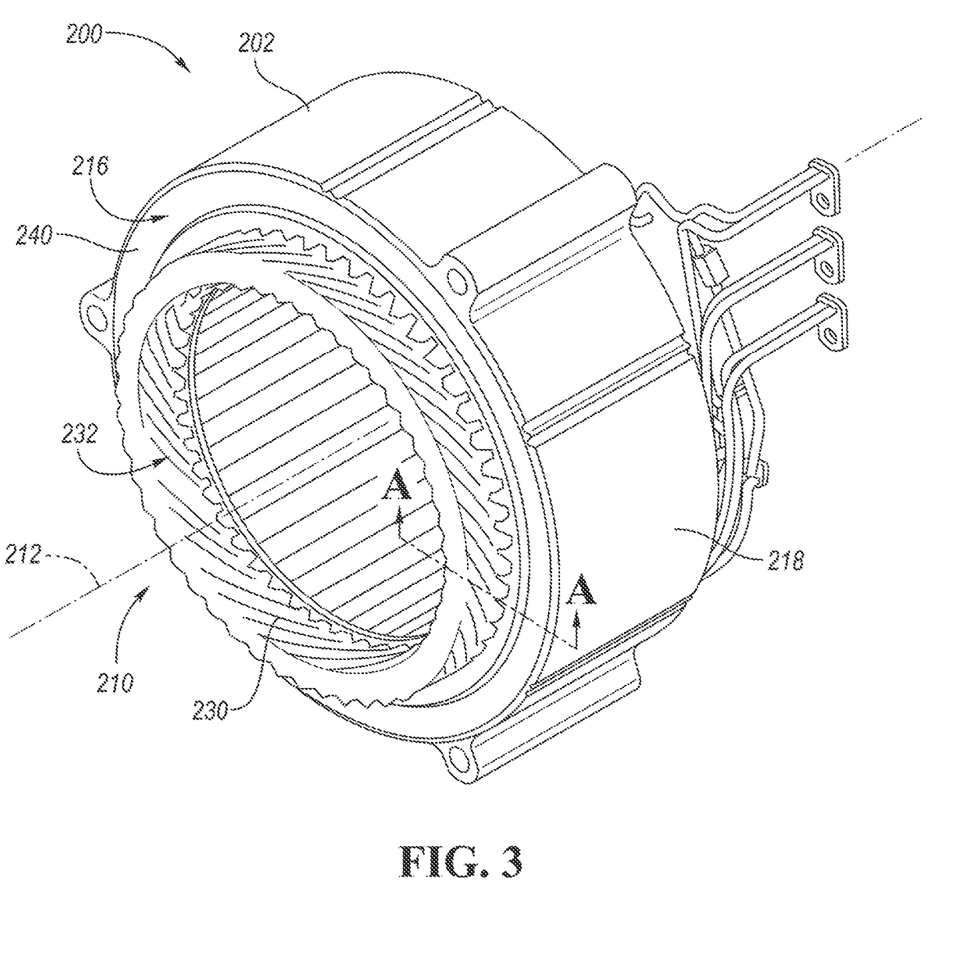
FIG. 3 is partial teardown perspective view of a n electric machine having an end cap removed.

As best seen in FIG. 3, windings 230 may be disposed about the stator 202 to generate an electromechanical field within the cavity 210 when energized to drive the rotor 206. The stator 202 includes a number of slots 214 spaced about a circumference of the stator. The windings 230 may be routed throughout the slots 214 in a serpentine fashion to create one or more winding paths to transmit current though the stator 202. Based on the arrangement of the windings 230, portions of the windings may protrude from an end face 216 of the stator core 218. In some specific examples, the windings 230 comprise copper hairpin windings that are routed throughout an iron alloy stator core. A plurality of individual hairpins may be inserted axially through slots 214 and have end portions 232 that protrude beyond end face 216 to adjoin hairpins in adjacent slots.

While the electric machine 200 operates as a motor, current supplied to the windings 230 generates an electromechanical field urging rotation of the rotor 206. While the electric machine 200 operates as a generator, current is generated in the windings 230 from inertial rotation of the rotor 206, and energy may be stored in the battery and/or utilized to power other vehicle components. During operation of the electric machine 200 both as a motor and as a generator, heat may be generated throughout the stator core 218 and windings 230. This heat may be removed from the electric machine using a cooling medium (e.g., by circulating transmission oil or other suitable cooling mediums). The cooling medium reduces the temperature of the windings 230 thereby increasing the amount of current capable of being provided to the electric machine without causing an undesirable degree of heat generation.

A closed coolant channel assembly may be provided to assist in managing thermal conditions of the windings of the electric machine. In some specific examples, the closed coolant channel assembly is formed from one or more injection molded polymeric components and mounted to the stator. According to some aspects of the present disclosure, the exposed end portions 232 serve as the primary path for heat extraction from the windings 230. The closed coolant channel assembly may define an internal cavity arranged to direct coolant flow to be in thermal communication with end portions 232 of windings 230 that protrude from slots 214 located at the end face 216.

The thermal management system may be arranged to exchange coolant with a reservoir or with other coolant circulation systems in the vehicle. Therefore, the thermal management system may include one or more inlet ports 234 to receive a coolant flow from a reservoir or other source, and one or more outlet ports 236 to exhaust coolant from the electric machine thermal management system. Depending upon the placement of the inlet ports 234 and outlet ports 236, as well as the overall quantity of ports, the coolant flow through the electric machine 200 may have a plurality of different cooling path designs. For example, the cooling flow paths may be routed in a series configuration through the electric machine, or alternatively routed in a parallel configuration. Further, the cooling flow paths, depending upon the design, can either be gravity fed or force-fed. In the case of force-fed cooling flow, convection heat transfer improves the cooling efficiency. This improved efficiency may avoid the need for the use of high thermal conductivity potting materials that may carry a greater cost relative to other available materials.

An end cap 220 may be provided near the end face 216 of the stator 202. The end cap 220 may also define at least a portion of an internal channel that is oriented to align with the end portions 232 of the windings 230 that protrude beyond the end face 216 of the stator core 218. According to some examples, the inlet ports 234 and/or outlet ports 236 are provided as part of the end cap 220. The coolant channel may also include an inner annular wall 222 and an outer annular wall 224 connected by an end face 226 of the end cap 220. The inner annular wall 222, the outer annular wall 145, and end face 226 may collectively define a channel 228 to circulate coolant therethrough. The channel 228 may be sized such that windings that protrude from end face 216 of the stator core 218 are received within the channel 228 when the end cap 220 is mounted to the stator core 218. The end cap 220 and the stator core 218 may be arranged with respect to one another to create a fluid seal therebetween and such that coolant routed through the channel 228 is contained therein. The end cap 220 may be arranged to form an annular shape such that the inner annular wall 222 at least partially defines cavity 210 through which the rotor 206 extends without interference. While a substantially U-shaped cross section is provided by way of example, alternative cross section shape may be suitable to provide desired coolant circulation properties.

The end cap 220 may also define one or more features on an exterior surface to assist in managing thermal conditions of windings routed through the stator 202. In some examples, one or more exterior fins may be formed on an outside portion of the end cap 220. Such fins may be evenly dispersed about a portion of the exterior surface of the end cap 220, or may be provided more densely spaced near a high heat concentration to operate as a heat sink. Positioning external fins proximate a portion of the channel 228 through which coolant flows may assist in removing, for example, heat from the coolant which is taken from the windings during coolant circulation.

The end cap 220 may further define one or more features on an interior surface of the channel 228 to assist in managing coolant flow within the channel. Features inside the channel 228 may also assist in managing both flow and thermal conditions by promoting turbulence of coolant flowing therethrough. Turbulence of coolant flow may draw additional heat from electrified windings in comparison to a constant coolant flow. In some examples, the end cap 220 may define a meandering trough at an internal portion of channel 228 to assist in distributing coolant to a desired area. More specifically, the meandering trough may be a recess defining a depth below the surface of end face 226. In other examples, the meandering trough may be defined by raised edges extending from the end face 226 into the channel 228. Such a meandering trough may be integrally formed as part of an injection molded process forming the end cap 220. In further examples, the meandering troughs may be defined by a separate component, such as an epoxy overmold.

Figure 4:
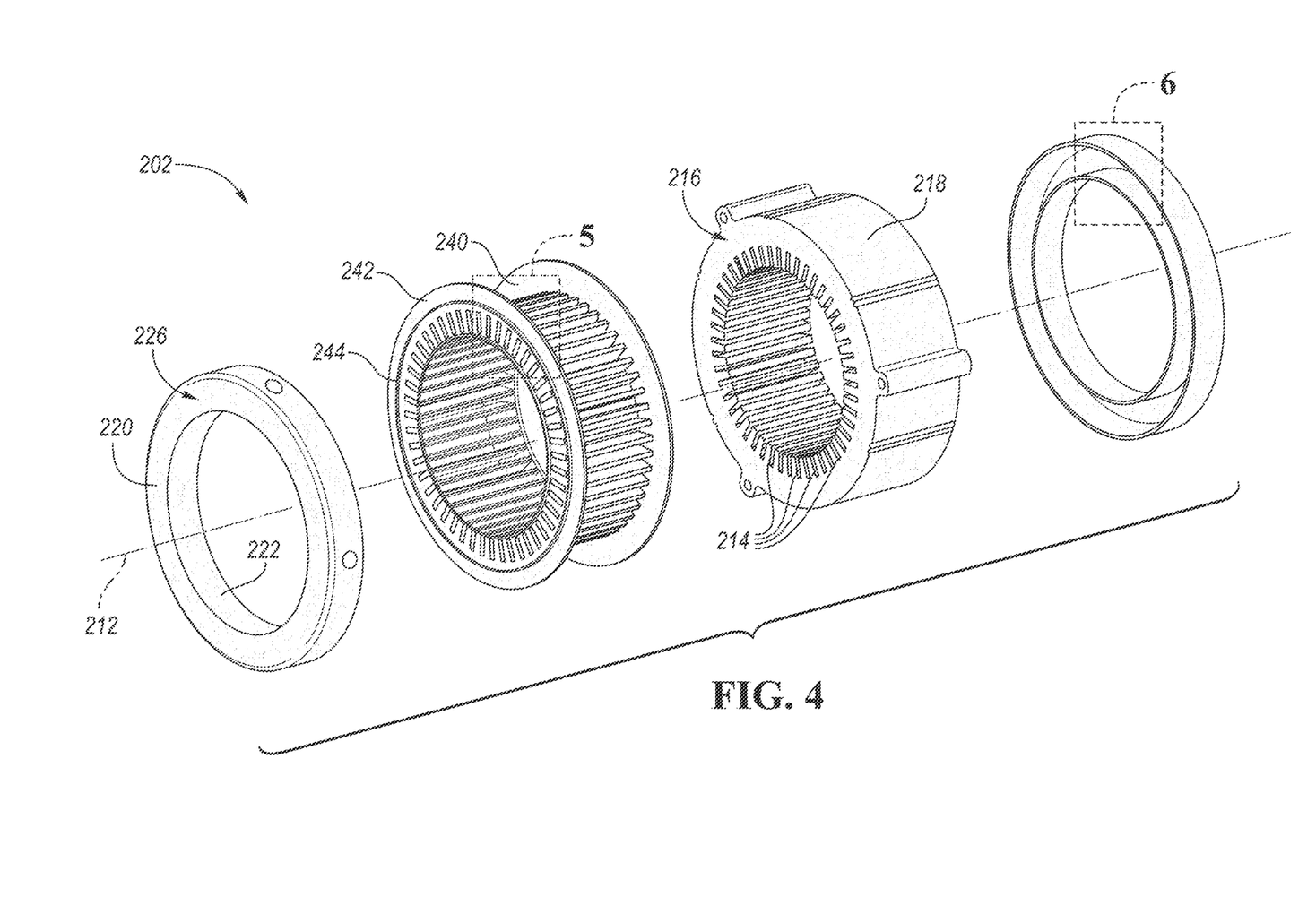
FIG. 4 is a partial exploded view of a stator assembly having a closed coolant circulation channel.

The stator 202 may also include an overmolded midsection 240 formed about the stator core 218. The midsection 240 may be in-situ injection molded from a polymeric material in order to match the shape and features of the stator core 218. More specifically, the midsection 240 may include a flange 242 that extends radially and mates with end face 216. The midsection 240 may also include slots 214 corresponding to the slots 214 formed in the stator core 218.

Figure 5:
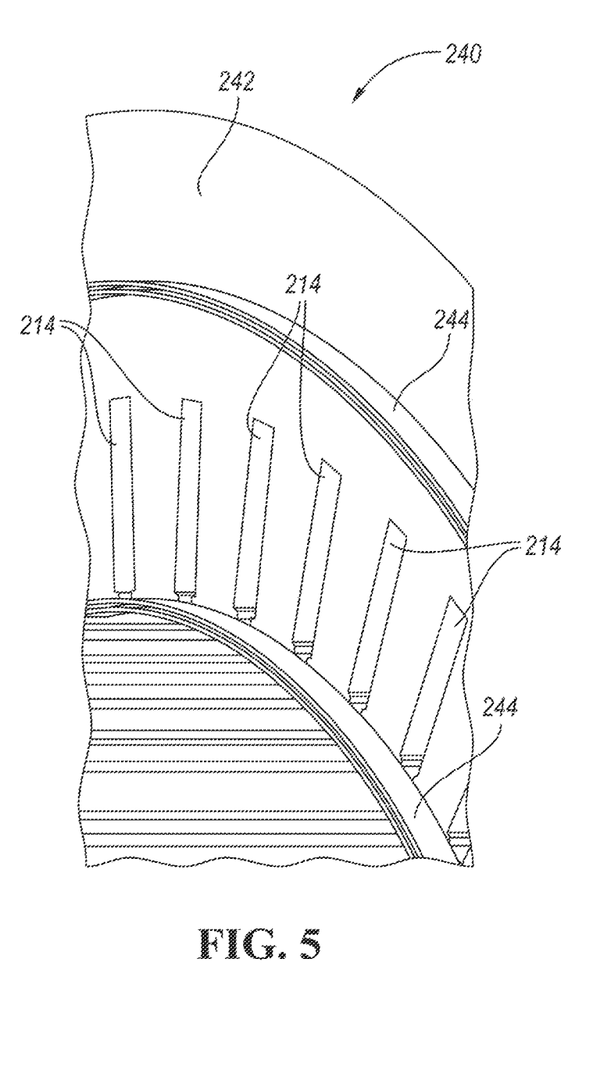
FIG. 5 is partial View 5 depicting a portion of an example overmolded midsection of a stator core.
Figure 6:
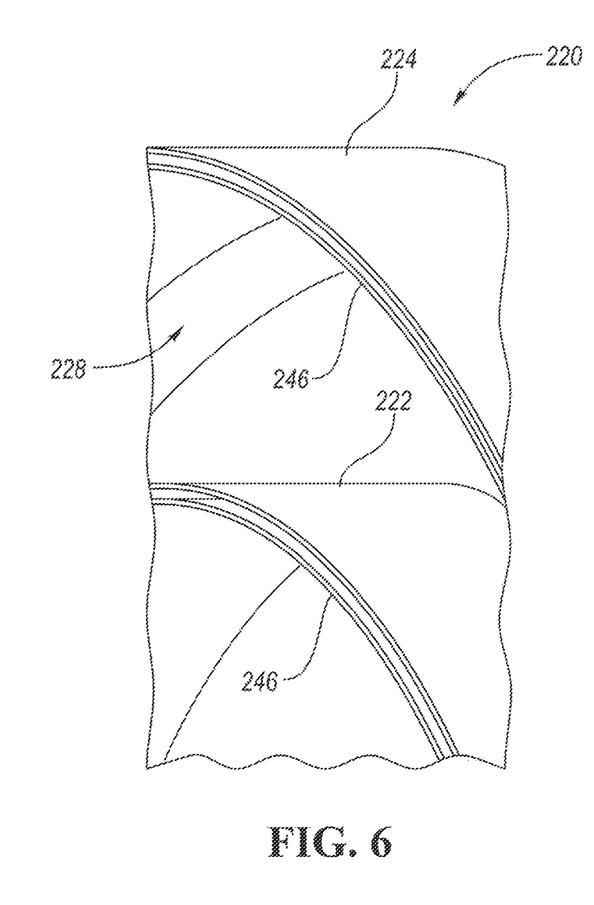
FIG. 6 is a partial View 6 depicting a portion of an example end cap.

As best seen in View B of FIG. 5 and View C of FIG. 6, the midsection 240 includes one or more integrally-formed interlocking features to retain the end cap 220 to the stator 202 and seal the channel 228. For example, a plurality of groove portions 244 may extend axially from the flange 242. The end cap 220 may include a plurality of tongue portions 246 that correspond to the groove portions 244. The tongue portions 246 are configured to seat within the groove portions 244 to create a fluid seal and retain coolant within the channel 228. In alternate examples, the tongue portions and groove portions may be reversed such that the midsection 240 includes mounting features that seat within corresponding mounting features of the end cap 220. According to aspects of the present disclosure, a first one of the end cap 220 and the midsection 240 includes a tongue portion arranged to seat within a groove portion on the other one of the end cap 220 and the midsection 24. Discussed in more detail below. the thermal management system may also include one or more supplemental sealing elements applied to various portions of the mounting features of the end cap and/or overmolded midsection 240.

While non-limiting, additional examples of thermal management systems follow, and these examples include a reference numeral convention for various components that corresponds to the examples provided above. That is, similar components of the additional thermal management system examples carry similar numbers as corresponding components of the previously-described examples.

Figure 7:
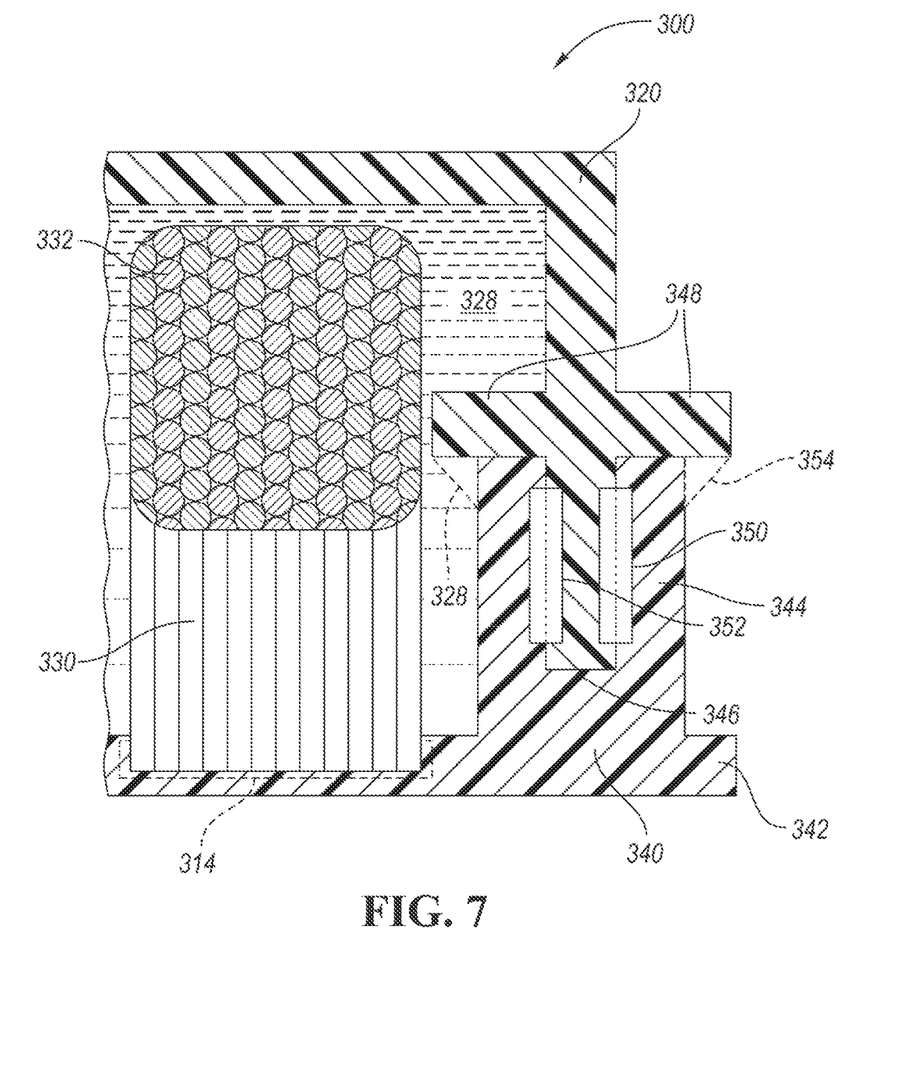
FIG. 7 is a partial cross section of an example thermal management system generally along line A-A of FIG. 3.

Referring to FIG. 7, another example thermal management system 300 is depicted in a partial cross section generally located along line A-A of FIG. 3. End cap 320 includes a tongue portion 346 that extends axially to seat within a groove portion 344 of midsection 340. The tongue portion 346 also includes at least one shoulder 348 arranged to mate with a distal portion of the groove portion 344.

A plurality of supplemental sealing elements is provided to create continuous seal paths about the thermal management system 300. According to the example of FIG. 7, four independent seal paths are provided to retain coolant within cavity 328. Specifically, each seal path may extend about a circumference of the stator midsection 340. Moreover, a sealant may be applied to at least one of the tongue portion 346 and the groove portion 344. According to some examples a pumpable sealant is applied to one of the end cap 320 and the midsection 304 to create a fluid seal therebetween. The pumpable sealant may be a room temperature vulcanizing (RTV) type sealant, glue, or other suitable variations. A first sealant path 350 and a second sealant path 352 are provided within the groove portion 344 to create a fluid seal on each of the radially outward side and the radially inward side, respectively, of the tongue portion 346. A third seal path 354 and fourth seal path 356 are also provided outside of the groove portion 344 to further supplement the fluid seal between the shoulder 348 of end cap 320 and the distal portions of the groove portion 344. The third seal path 354 may be located near the radially outward shoulder 348 and the fourth seal path may be located at the radially inward shoulder 348. According to some examples, sealing elements are provided at each of a plurality of laterally-facing surfaces to create a fluid seal.

Figure 8:
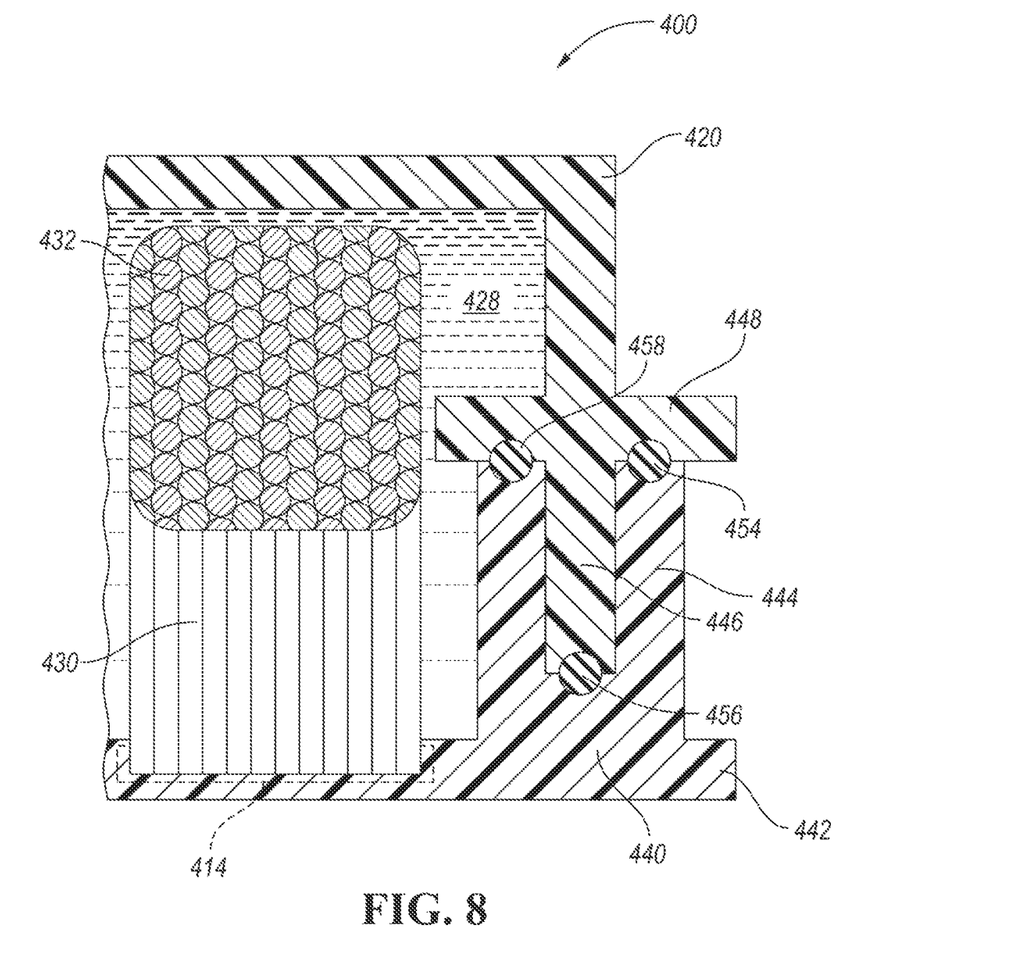
FIG. 8 is a partial cross section of a second example thermal management system generally along line A-A of FIG. 3.

Referring to FIG. 8, a further example thermal management system 400 is depicted in a partial cross section generally located along line A-A of FIG. 3. End cap 420 also includes a tongue portion 446 that extends axially to seat within a groove portion 444 of midsection 440. The tongue portion 446 also includes at least one shoulder 448 arranged to mate with a distal portion of the groove portion 444.

Supplemental sealing elements may be provided as solid elements as opposed to pumpable sealing elements. According to the example of FIG. 8, three independent seal paths are provided by a plurality of O-rings. The O-rings may be integrally formed with one of the end cap 420 and the midsection 440, for example by a dual-shot injection molding process. In other examples the O-rings may be assembled to either of the end cap 420 and the midsection 440 to form a fluid seal when the two components are abutted against one another. A first O-ring 454 is disposed near outer shoulder 448 on a radially outward side of the tongue portion 446. A second O-ring 456 is disposed near a base portion of the groove portion 444 and is compressed against a distal end of the tongue portion 446. A third O-ring 458 is disposed near outer shoulder 448 on a radially inward side of tongue portion 446. While O-rings having a generally circular cross section are provided by way of example, other shapes of a solid compression sealing elements may also be suitable.

In some alternate examples, one or more gaskets having a rectangular shape may be similarly applied to generate a fluid seal between the end cap 420 and the midsection 440. According to further examples, sealing elements are provided at each of a plurality of axially-facing surfaces to create a fluid seal upon compression of the end cap 420 against the midsection 440. According to still further examples, a supplemental sealing element may be an integrally-formed deflection element overmolded onto one of the end cap 420 and the midsection 440. More specially, deflection lips and/or compressive sealing elements may be integrally formed on the end cap or midsection such that the coolant channel becomes self-sealed when the end cap is assembled to the stator core without additional operations or separate sealing components.

Figure 9:
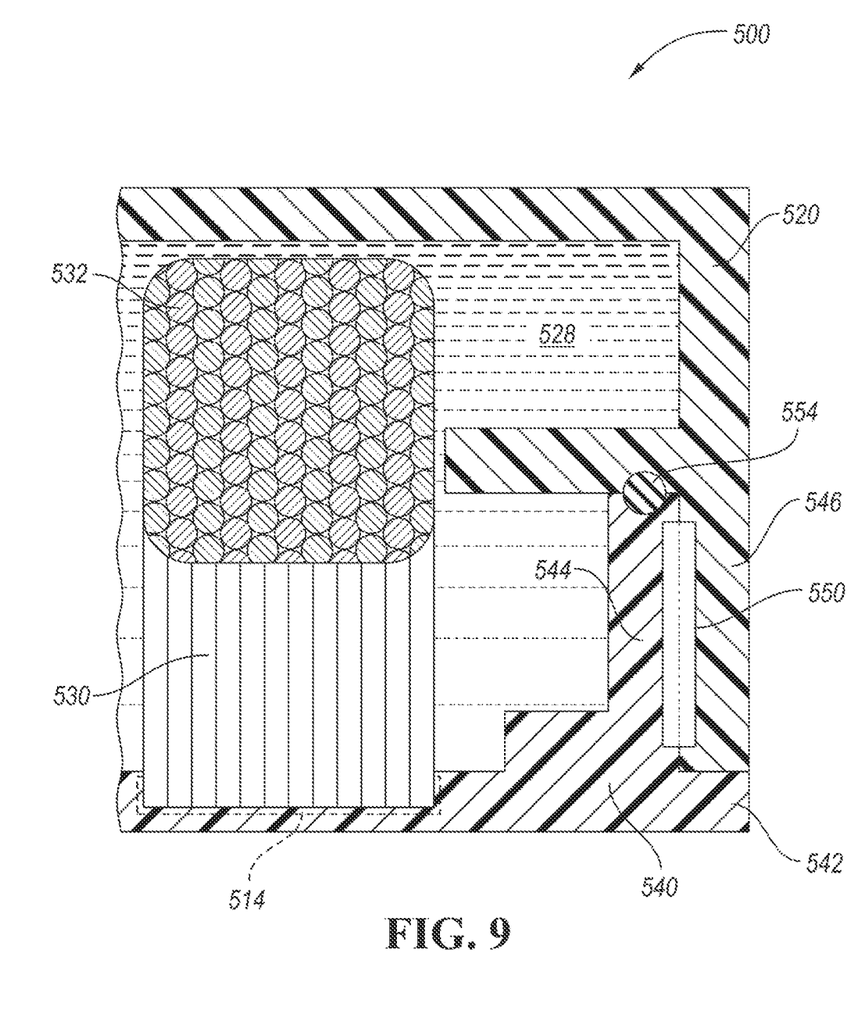
FIG. 9 is a partial cross section of a third example thermal management system generally along line A-A of FIG. 3.

Referring to FIG. 9, another further example thermal management system 500 is depicted in a partial cross section generally located along line A-A of FIG. 3. Distinct from previous examples, end cap 520 includes an outer tongue portion 546 that extends axially to seat against an outward surface of an inner tongue portion 544 of midsection 540. The tongue portion 546 also includes at least one shoulder 548 arranged to mate with a distal end of the inner tongue portion 544. A combination of solid sealing elements and pumpable sealing elements may be provided to create a fluid seal. A first sealant path 550 is provided between a radially-inward surface of the outer tongue portion 546 and a radially-outward surface of the inner tongue portion 544. As described about the first sealant path 550 may be provided by any of a number of suitable pumpable sealants. An O-ring 554 is also provided near a distal portion of the tongue portion 544 to create an axial compression seal between the inner tongue portion 544 and the shoulder 548 of the end cap 520. According to other aspects, sealing elements are provided at both laterally-facing surfaces and axially-facing surfaces to create a fluid seal between the end cap 520 and the midsection 540 thereby retaining coolant within the channel 528.

Figure 10:
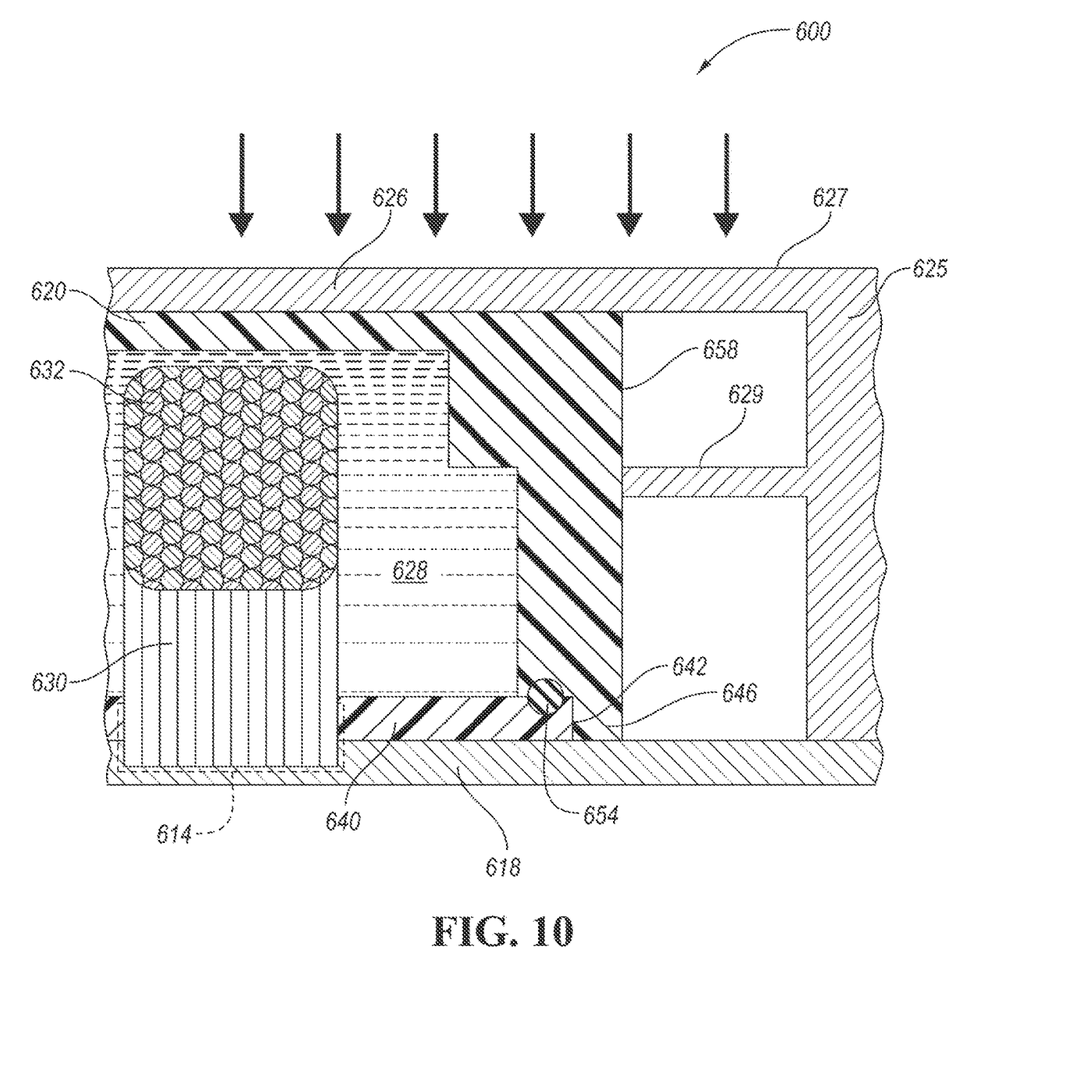
FIG. 10 is a partial cross section of a fourth example thermal management system generally along line A-A of FIG. 3.

Referring to FIG. 10, yet another further example thermal management system 600 is depicted in a partial cross section generally located along line A-A of FIG. 3. According to some aspects, other components may be configured to provide a mechanical compression force to augment one or more sealing elements. For example, a transmission housing 625 may be configured to support and encase the electric machine. More specifically, the transmission housing 625 is configured to mate to stator core 618 to secure the electric machine. Since the transmission housing is arranged as a structural component, additional feature may be included at little cost to support the end cap 620. The transmission housing 625 is configured such that an end face 627 abuts an end face 626 of the end cap 620 to generate an axial compression force against the end cap 620. In the case of a compression seal such as O-ring 654, the force caused by the securing of the transmission housing 625 may augment the seal.

The transmission housing 625 may also include features that engage laterally-facing surfaces of the end cap 620. For example, shoulder 629 may be integrally formed in the transmission housing 625 to engage a radially outward facing surface 658 of the end cap 620. In this way the end cap 620, which may be formed from a plastic material, may be further secured by the structural aspects of the transmission housing 625.

Figure 11:
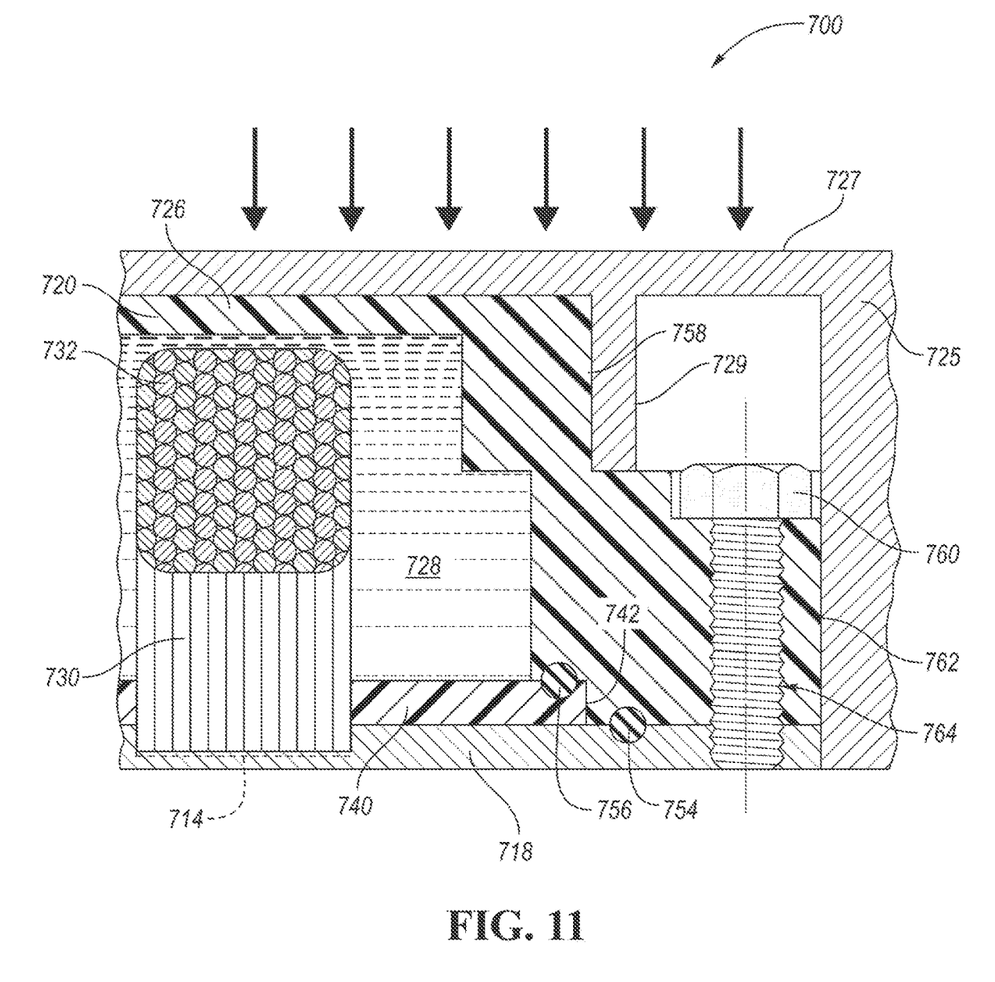
FIG. 11 is a partial cross section of a fifth example thermal management system generally along line A-A of FIG. 3.

Referring to FIG. 11, yet another further example thermal management system 700 is depicted in a partial cross section generally located along line A-A of FIG. 3. According to some aspects, other mechanical retaining features may be provided to secure the end cap 720 to the stator core 718. One or more threaded fasteners 760 may be disposed about the circumference of the stator core 718 and assist in securing the end cap 720 to the stator. For example, the end cap 720 may define a radially extending flange 762 including a hole 764 to receive the threaded fastener 760. Since the fastener 760 generates a compressive force once secured, compression sealing elements may be provided to create a fluid seal to retain coolant within the channel 728. Moreover, since the fastener 760 is mechanically secured to the stator core 718, at least on sealing element may be provided directly between the end cap 720 and the stator core 718. A first O-ring 754 may be disposed on an underside of flange 762 of the end cap 720. When the end cap 720 is secured by threaded fastener 760, the compression force engages first O-ring 754 creating a first seal path. A second O-ring 756 may be disposed near a radially outer edge of flange 742 of the overmold 740. The compression force generated by the securing of threaded fastener 760 similarly engages the second O-ring 756 to cause a second seal path to maintain coolant within the channel 728. While threaded fasteners are discussed herein by way of example, any suitable fastening system that compresses the end cap against the stator may be within the scope of the present disclosure.

Similar to previous examples, a transmission housing 725 may include an end face 727 abuts an end face 726 of the end cap 620 to generate additional axial compression against the end cap 720. Additionally, the transmission housing 725 may define one or more shoulder elements 729 to engage a radially-outward facing surface 758 to further secure the end cap 720.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electric machine for an electrified vehicle comprising:
    a stator core configured to receive a plurality of windings;
    an overmolded midsection formed about the stator core and defining a first interlocking feature disposed near an end face of the stator core;
    an end cap defining at least a portion of a coolant channel and a second interlocking feature configured to engage the first interlocking feature and create a fluid seal to retain fluid within the coolant channel, wherein the coolant channel is arranged to encase end portions of the plurality of windings and direct circulating coolant across the end portions; and
    a transmission housing configured to secure the stator core and generate an axial compression force against the end cap to augment the fluid seal.

2. The electric machine of claim 1, wherein the first interlocking feature comprises a groove portion extending axially from the midsection and the second interlocking feature comprises a tongue portion extending axially from the end cap and configured to seat within the groove portion.

3. The electric machine of claim 2, further comprising at least one sealing element disposed within the groove portion and configured to engage the tongue portion and create the fluid seal to retain fluid within the coolant channel.

4. The electric machine of claim 3, wherein the at least one sealing element comprises at least one of a solid compression seal and a pumpable sealant.

5. The electric machine of claim 1, further comprising at least one sealing element disposed between the midsection and the end cap to create the fluid seal of the coolant channel.

6. The electric machine of claim 5, wherein at least one of the midsection and the end cap is formed from an injection molded polymeric material and the at least one sealing element is integrally formed thereupon.

7. A thermal management system for an electric machine of an electrified vehicle comprising:
    a stator core having a plurality of windings routed therethrough, wherein end portions of the windings extend beyond an end face of the stator core;
    an overmolded midsection formed about the stator core including a radially-extending flange covering at least a portion of the end face;
    an annular end cap secured to the stator core to form a closed coolant circulation channel, wherein each of the midsection and the end cap include corresponding interlocking features that engage to generate a fluid seal to retain fluid within the coolant circulation channel; and
    a transmission housing configured to secure the stator core and generate an axial compression force against the end cap to augment the fluid seal.

8. The thermal management system of claim 7, wherein a first interlocking feature comprises a groove portion extending axially from one of the end cap and the midsection and a second interlocking feature comprises a tongue portion extending axially from the other one of the end cap and the midsection, and the tongue portion is configured to seat within the groove portion.

9. The thermal management system of claim 8, further comprising at least one sealing element disposed within the groove portion and configured to engage the tongue portion and cause the fluid seal to retain fluid within the coolant circulation channel.

10. The thermal management system of claim 9, wherein the at least one sealing element comprises at least one of an O-ring, a gasket, an overmolded deflection element, and a pumpable sealant.

11. The thermal management system of claim 7, wherein the end cap is secured to the stator core by at least one threaded fastener, and a compression force generated from securing the threaded fastener compresses a sealing element disposed between the end cap and the midsection.

* * * * *